United States Patent
Tyrer et al.

(10) Patent No.: US 11,986,712 B2
(45) Date of Patent: May 21, 2024

(54) APPARATUS FOR MOUNTING ACCESSORIES TO A TOP SURFACE OF A GOLF CART ROOF

(71) Applicant: Club Pro Manufacturing, Deer Park, NY (US)

(72) Inventors: Stephen E. Tyrer, Deer Park, NY (US); Richard K. Harris, Pinckney, MI (US)

(73) Assignee: Club Pro Manufacturing, Deer Park, NY (US)

( * ) Notice: Subject to any disclaimer, the term of this patent is extended or adjusted under 35 U.S.C. 154(b) by 476 days.

(21) Appl. No.: 17/154,247

(22) Filed: Jan. 21, 2021

(65) Prior Publication Data

US 2021/0252355 A1    Aug. 19, 2021

Related U.S. Application Data

(60) Provisional application No. 62/964,252, filed on Jan. 22, 2020.

(51) Int. Cl.
*A63B 57/20*      (2015.01)

(52) U.S. Cl.
CPC .................. *A63B 57/20* (2015.10)

(58) Field of Classification Search
CPC ..... A63B 57/20; B60J 7/12; B60J 7/16; B60J 7/14; B60R 9/045; B60R 9/04
See application file for complete search history.

(56) References Cited

U.S. PATENT DOCUMENTS

| | | | | |
|---|---|---|---|---|
| 5,725,062 A | * | 3/1998 | Fronek | B60L 8/00 |
| | | | | 180/2.2 |
| 5,865,498 A | * | 2/1999 | Grogan | B60P 3/36 |
| | | | | 52/11 |
| 6,220,657 B1 | * | 4/2001 | Rea | B60J 7/04 |
| | | | | 296/220.01 |
| 6,547,304 B1 | * | 4/2003 | Conner | B60J 7/08 |
| | | | | 296/145 |
| 6,692,058 B1 | * | 2/2004 | Micco | B60J 7/04 |
| | | | | 280/DIG. 5 |
| 10,093,161 B1 | * | 10/2018 | Seitz, Jr. | E04H 15/06 |
| 10,160,298 B1 | * | 12/2018 | Seitz, Jr. | B60J 7/143 |
| 11,155,215 B1 | * | 10/2021 | Brinkman | B60R 9/06 |
| 2006/0284442 A1 | * | 12/2006 | Tyrer | B60J 7/1278 |
| | | | | 296/102 |
| 2011/0174448 A1 | * | 7/2011 | Haagenson | B60J 5/0487 |
| | | | | 160/124 |
| 2014/0035313 A1 | * | 2/2014 | Sobik | B60J 7/0007 |
| | | | | 296/136.12 |
| 2014/0084621 A1 | * | 3/2014 | DeVoss, Jr. | B60J 1/2011 |
| | | | | 296/135 |
| 2014/0103085 A1 | * | 4/2014 | Patronik | B60R 9/058 |
| | | | | 224/318 |
| 2014/0232147 A1 | * | 8/2014 | Held | B60Q 1/2611 |
| | | | | 296/210 |

(Continued)

*Primary Examiner* — Brian D Nash
(74) *Attorney, Agent, or Firm* — Hoffmann & Baron, LLP

(57) ABSTRACT

An apparatus for mounting accessories to a golf cart roof that includes an elongated attachment member extending between the front and rear or the left and right side of the roof and secured to the roof by a slotted base, fasteners, or compression connectors. The apparatus allows accessories, such as curtains or wind screens to be quickly and easily attached to or detached from a golf cart.

11 Claims, 5 Drawing Sheets

(56) References Cited

U.S. PATENT DOCUMENTS

| | | | | |
|---|---|---|---|---|
| 2015/0224860 | A1* | 8/2015 | Bowles | B60J 7/20 |
| | | | | 296/210 |
| 2016/0362055 | A1* | 12/2016 | McFadden | B60R 9/058 |
| 2017/0151860 | A1* | 6/2017 | Schneider | B60J 1/006 |
| 2017/0368919 | A1* | 12/2017 | Guempel | B60J 5/0469 |
| 2018/0156381 | A1* | 6/2018 | Gulledge | B60Q 3/267 |
| 2018/0208125 | A1* | 7/2018 | Tyrer | B60R 9/06 |
| 2020/0361393 | A1* | 11/2020 | Cabaniss | B60R 9/045 |
| 2021/0122218 | A1* | 4/2021 | Ritchey | B60J 7/196 |
| 2021/0178876 | A1* | 6/2021 | Seitz | B60J 7/143 |
| 2021/0245591 | A1* | 8/2021 | Gouldie | B60J 7/1628 |
| 2021/0252355 | A1* | 8/2021 | Tyrer | B60R 9/058 |
| 2021/0347324 | A1* | 11/2021 | Borgsdorf | B60R 21/06 |
| 2022/0297610 | A1* | 9/2022 | Zaremba | A45F 3/02 |
| 2023/0058057 | A1* | 2/2023 | Tyrer | B60J 7/12 |
| 2023/0182552 | A1* | 6/2023 | Hollowell | B60J 7/143 |
| | | | | 296/102 |

* cited by examiner

Detail B from FIG. 2

Detail B from FIG. 6

Detail B from FIG. 10

Detail D from FIG. 14

APPARATUS FOR MOUNTING ACCESSORIES TO A TOP SURFACE OF A GOLF CART ROOF

This application claims priority from provisional patent application No. 62/964,252, filed on Jan. 22, 2020, which is incorporated herein in its entirety.

FIELD OF THE INVENTION

The present invention is an apparatus for mounting accessories to a top surface of a golf cart roof. In particular, the present invention relates to structures on the roof of a golf cart that receive devices for attaching accessories.

BACKGROUND

Golf carts are used to transport golfers around a golf course during a round of golf. Typically, golf carts have a single bench seat for two golfers with a roof supported at four corners for protection from the sun and rain. The sides of the golf cart are open to make it easy for the golfers to get into and out of the cart. The open sides do not protect the golfers from wind and rain. Accordingly, there is a need for an accessory that can be used for attaching temporary protection on the sides of a golf cart.

SUMMARY

In accordance with the present invention, an apparatus for mounting accessories to a golf cart roof is provided. The golf cart roof having front and rear ends and right and left sides.

In a first embodiment, the apparatus has front and rear ends and right and left sides and includes an elongated base member and an elongated attachment member. The elongated base member has a top surface, a first end, a second end, and a horizontal slot in communication with the top surface through an opening. The elongated slotted base is mounted in a channel or affixed to the roof and substantially extends between the front and rear ends or the left and right sides. The horizontal slot, and the opening extend between the first and second ends of the elongated base. The elongated attachment member is slidably insertable into the slotted base and has a neck that extends through the opening in the slotted base to a top surface, which is adapted for the attachment of accessories. The accessories can be integrally formed as part of the elongated attachment member and the channel can be integrally formed as part of the golf cart roof.

In a second embodiment, the apparatus includes an elongated base member, a plurality of fastening devices, and an elongated attachment member. The elongated base member has a first end, a second end, a top surface, a horizontal slot in communication with the top surface through an opening, and opposing stepped sidewalls having a plurality of mounting apertures. The elongated base member is mounted in a channel that substantially extends between the front and rear ends or the left and right sides. The plurality of fastening devices secure the elongated base member in the channel. The elongated attachment member is slidably insertable into the slotted base and has a neck that extends through the opening in the slotted base to a top surface, which is adapted for the attachment of accessories. The accessories can be integrally formed as part of the elongated attachment member and the channel can be integrally formed as part of the golf cart roof.

In a third embodiment, the apparatus includes an elongated attachment member and a plurality of fastening devices. The elongated attachment member has a length, a first end, a second end, and at least two sections extending along the length. A first section is substantially flat and a second section extends downwardly from the first section. The elongated attachment member substantially extends between the front and rear ends or the left and right sides. The plurality of fastening devices secure the elongated attachment member to the roof and a section of the elongated attachment member opposite the first section is adapted for the attachment of accessories. The first section of the elongated attachment member has a plurality of apertures for the plurality of fastening devices.

In a fourth embodiment, the apparatus includes an elongated lip, an elongated attachment member, and a plurality of fastening devices. The elongated lip is attached to and extends upwardly from the left side, right side, and/or rear of the golf cart roof. The elongated attachment member has a width, a first end, and a second end and substantially extends between the front and rear ends or the left and right sides. The width of the elongated attachment member is U-shaped and adapted to snugly fit over the lip. The plurality of fastening devices secure the elongated attachment member to the lip. The accessories can be integrally formed as part of the elongated attachment member and the lip can be integrally formed as part of the golf cart roof.

In a fifth embodiment, the apparatus includes an elongated attachment member, two or more threaded receptacles, and two or more fastening devices. The elongated attachment member has a first end and a second end and is mounted on the roof and substantially extends between the front and rear ends or the left and right sides. The elongated attachment member has a U-shaped section and an upwardly extending section. The two or more threaded receptacles are affixed to the golf cart roof on the left side, the right side, or the rear end. The U-shaped section of the elongated attachment member fits over the two or more threaded receptacles. The two or more fastening devices secure the elongated attachment member to the threaded receptacles. The upwardly extending section is adapted to secure accessories to the golf cart. The elongated attachment member can include one or more apertures that correspond to the locations of the threaded receptacles. The two or more fastening devices pass through the apertures and into the threaded receptacles.

BRIEF DESCRIPTION OF THE FIGURES

The preferred embodiments of the apparatus for mounting accessories to a golf cart roof of the present invention, as well as other objects, features and advantages of this invention, will be apparent from the accompanying drawings wherein.

DETAILED DESCRIPTION

Figure 1:
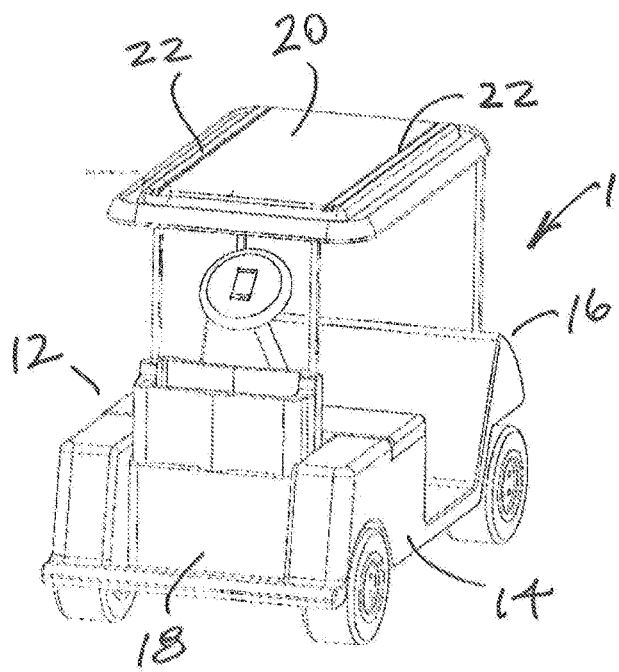
FIG. 1 is a rear peripheral view of a golf cart with a first embodiment of the accessories mounting device having two elongated attachment members mounted on the roof.

The present invention is an apparatus for mounting accessories to the roof of a golf cart. The roof of the golf cart is provided with at least two elongated attachment structures extending between the front and rear of the roof on the left and right sides and/or between the left and right sides at the rear of the roof. The accessories mounting apparatus is connected to the elongated attachment structures and provides easy installation of a valance, sidewall or other accessory to the roof of the golf cart. One of the advantages of the mounting apparatus is that it allows the accessory, such as a windscreen or curtain, to be mounted on the top side of the canopy (roof) without drilling a mounting hole through the canopy. Moreover, windscreens currently in use are mounted to the underside of the canopy on the interior side. This design makes it more difficult for taller golfers to get in and out of the cart.

In a first embodiment, the apparatus for mounting accessories includes a slotted base and an elongated attachment member. The slotted base has a top surface, a horizontal slot in communication with the top surface through an opening. The slotted base is mounted in a channel on the left side, right side, and/or rear side of the golf cart roof and extends between the front and rear ends or the left and right sides. The elongated attachment member is slidably insertable into the slotted base and has a neck that extends through the opening in the slotted base to a top surface.

In a second embodiment, the apparatus for mounting accessories to a golf cart roof includes a slotted base, a plurality of fastening devices, and an elongated attachment member. The slotted base has a top surface, a horizontal slot in communication with the top surface through an opening, and opposing stepped sidewalls having a plurality of mounting apertures. The slotted base is mounted in a channel on the left side, right side, and/or rear side of the golf cart roof and extends between the front and rear ends or the left and right sides. The plurality of fastening devices pass through the stepped sidewalls and secure the slotted base in the channel. The elongated attachment member is slidably insertable into the slotted base and has a neck that extends through the opening in the slotted base to a top surface.

The third embodiment of an apparatus for mounting accessories to a golf cart roof includes an elongated attachment member and a plurality of fastening devices. The elongated attachment member is mounted on the left side, right side, and/or rear side of the golf cart roof and extends between the front and rear ends or the left and right sides. The elongated attachment member has a first curved end. The plurality of fastening devices secure the elongated attachment member to the roof.

In the fourth embodiment, the apparatus for mounting accessories to a golf cart roof includes an elongated attachment member and a plurality of fastening devices. The elongated attachment member is mounted on the left side, right side, and/or rear side of the golf cart roof and extends between the front and rear ends or the left and right sides. The elongated attachment member has a U-shaped end that fits over a lip that extends from the roof. The plurality of fastening devices secure the elongated attachment member to the lip.

In the fifth embodiment, the apparatus for mounting accessories to a golf cart roof includes an elongated attachment member, two or more threaded receptacles, and two or more fastening devices. The elongated attachment member can be mounted on the left side, right side, and/or rear end of the golf cart roof and extends between the front and rear ends or the left and right sides. The elongated attachment member has a U-shaped section that fits over the two or more receptacles and a second section that extends upwardly towards the perimeter of the roof. The two or more fastening devices secure the elongated attachment member to the threaded receptacles and accessories have elongated attachment connectors that fit over the upwardly extending second section of the mounting apparatus.

In the first embodiment shown in FIGS. 1-4, the accessories mounting apparatus includes two channels formed in the roof of the golf cart, a slotted base inserted into the channel and a mounting rail that is received by the slotted base. FIG. 1 shows a golf cart 10 having left and right sides 12, 14 and front and rear ends 16, 18 and a roof 20 extending above the golf cart 10 and between the two ends 16, 18. An accessory mounting apparatus 22 is attached to the roof 20 on the left and right sides and extends between the front and rear end 16, 18 of the roof 20. Another accessory mounting apparatus (not shown) can be mounted at the rear of the roof between the left and right sides.

Figure 2:
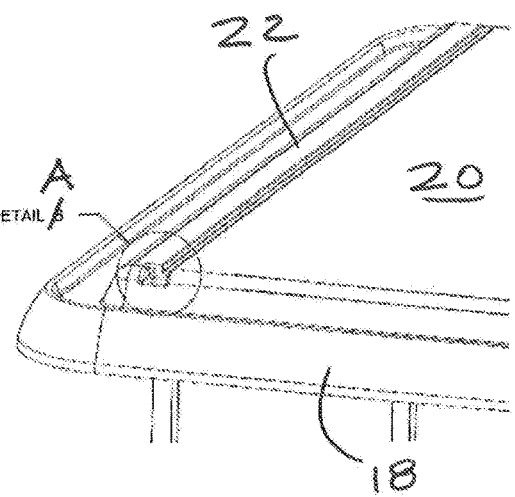
FIG. 2 is an enlarged view of the end of one of the two elongated attachment members shown in FIG. 1.
Figure 3:
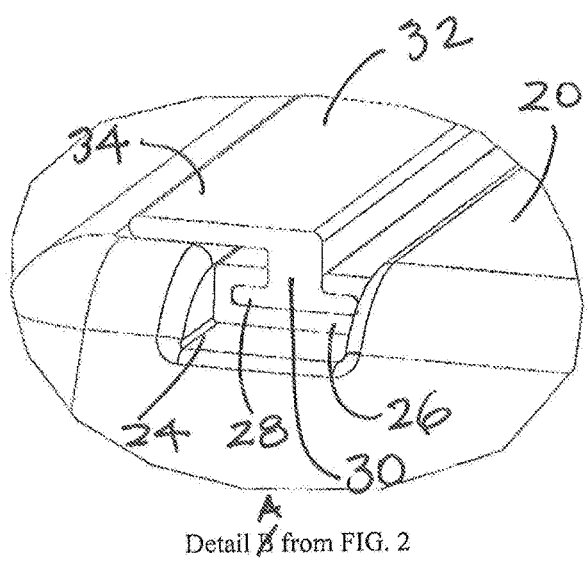
FIG. 3 is a detail showing a peripheral view of the end of the elongated attachment member shown in FIG. 2.
Figure 4:
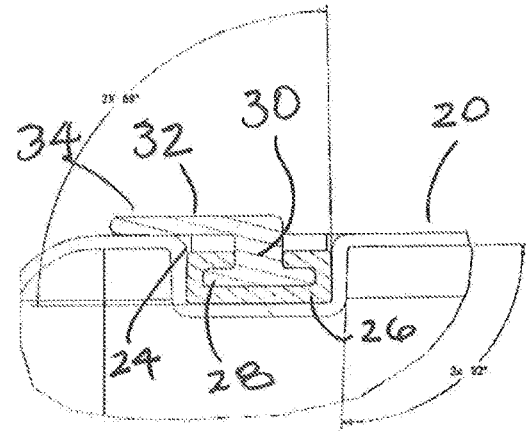
FIG. 4 is an end view of the end of the elongated attachment member shown in FIG. 2.

FIG. 2 shows an enlarged view of the accessories mounting apparatus 22 on the left side with FIGS. 3 and 4 showing views of Detail A. Each accessory mounting apparatus 22 is mounted in a channel 24 formed in the roof 20. Typically, the roof 20 is made from a hard plastic and the channels 24 are formed as part of the roof 20. Each accessory mounting apparatus 22 includes a slotted base 26 that snugly fits into the channel 24 and substantially extends the length of the channel 24. The slotted base 26 includes a slot 28 extending parallel to the roof 20 and an opening 30 at the top. The slot 28 and the opening 30 extend the entire length of the slotted base 26. An elongated attachment member 32 fits into the slotted base 26 and extends through the opening 30 for a part or for the entire length of the slotted base 26. The elongated attachment member 32 can have a top surface 34 that extends towards the edge of the roof 20. A windscreen or curtain (not shown) can be attached to or integrally formed as part of the elongated attachment member 32. Various accessories can be attached to the elongated attachment member 32, such as a valance or sidewall for protecting the interior of the golf cart 10 from the weather.

Figure 5:
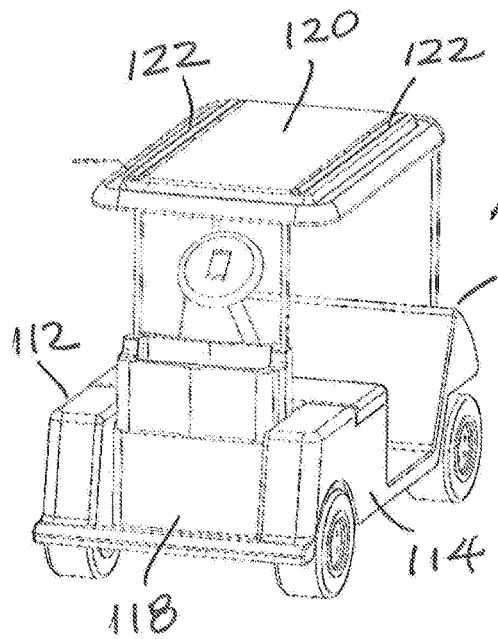
FIG. 5 is a rear peripheral view of a golf cart with a second embodiment of the accessories mounting device having two elongated attachment members mounted on the roof.

In the second embodiment shown in FIGS. 5-8, the accessories mounting apparatus includes two channels with stepped sidewalls formed in the roof of the golf cart, a slotted base inserted into the channel and a mounting rail that is received by the slotted base. FIG. 5 shows a golf cart 110 having left and right sides 112, 114 and front and rear ends 116, 118 and a roof 120 extending above the golf cart 110 and between the two ends 116, 118. An accessory mounting apparatus 122 is attached to the roof 120 on the left and right sides and extends between the front and rear end 116, 118 of the roof 120. Another accessory mounting apparatus (not shown) can be mounted at the rear of the roof between the left and right sides.

Figure 6:
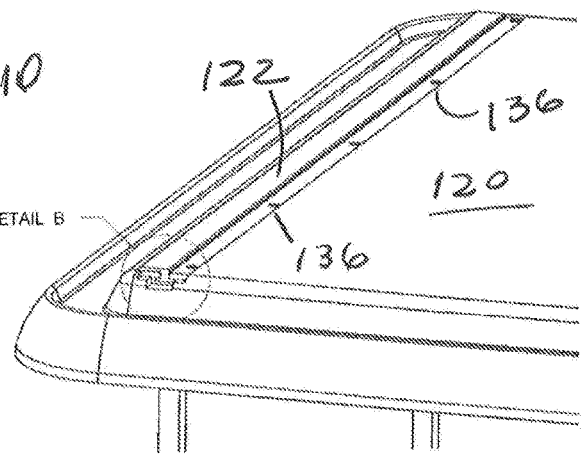
FIG. 6 is an enlarged view of the end of one of the two elongated attachment members shown in FIG. 5.
Figure 7:
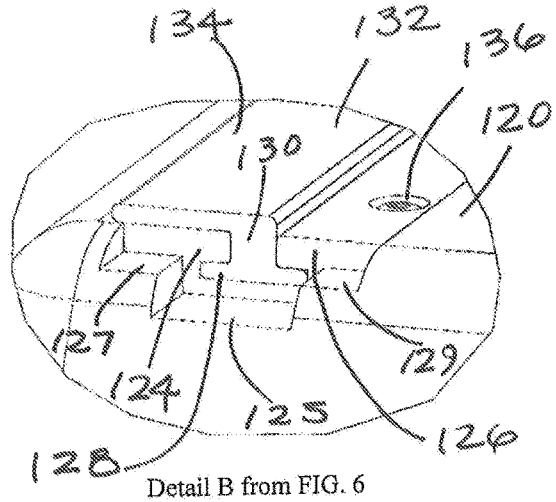
FIG. 7 is a detail showing a peripheral view of the end of the elongated attachment member shown in FIG. 6.
Figure 8:
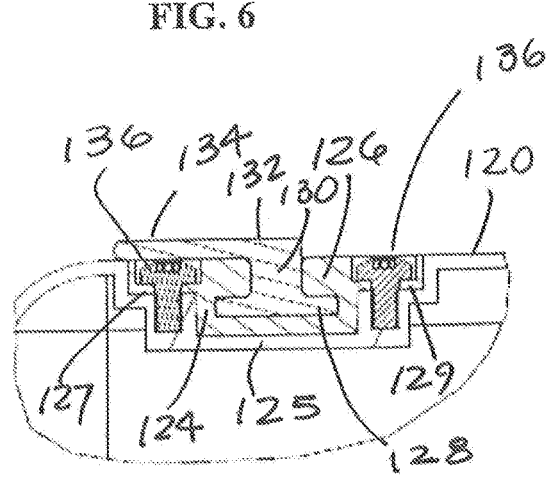
FIG. 8 is an end view of the end of the elongated attachment member shown in FIG. 6.

FIG. 6 shows an enlarged view of the accessories mounting apparatus 122 on the left side with FIGS. 7 and 8 show views of Detail B. Each accessory mounting apparatus 122 is mounted in a channel 124 formed in the roof 120. The channel 124 has a bottom 125 and two stepped sidewalls 127, 129 between the bottom 125 and the surface of the roof 120. Typically, the roof 120 is made from a hard plastic and the channels 124 are formed as part of the roof 120. Each accessory mounting apparatus 122 includes a slotted base 126 that snugly fits into the channel 124 and substantially extends the length of the channel 124. A plurality of fastening devices 136 is inserted through apertures in the slotted base 126 and secured to the steps 127, 129 in the channel 124. The slotted base 126 includes a slot 128 extending parallel to the roof 120 and an opening 130 at the top. The slot 128 and the opening 130 extend the entire length of the slotted base 126. An elongated attachment member 132 fits into the slotted base 126 and extends through the opening 130 for a part or for the entire length of the slotted base 126. The elongated attachment member 132 can have a top surface 134 that extends towards the edge of the roof 120. A windscreen or curtain (not shown) can be attached to or integrally formed as part of the elongated attachment member 132. Various accessories can be attached to the elongated attachment member 132, such as a valance or sidewall for protecting the interior of the golf cart 110 from the weather.

Figure 9:
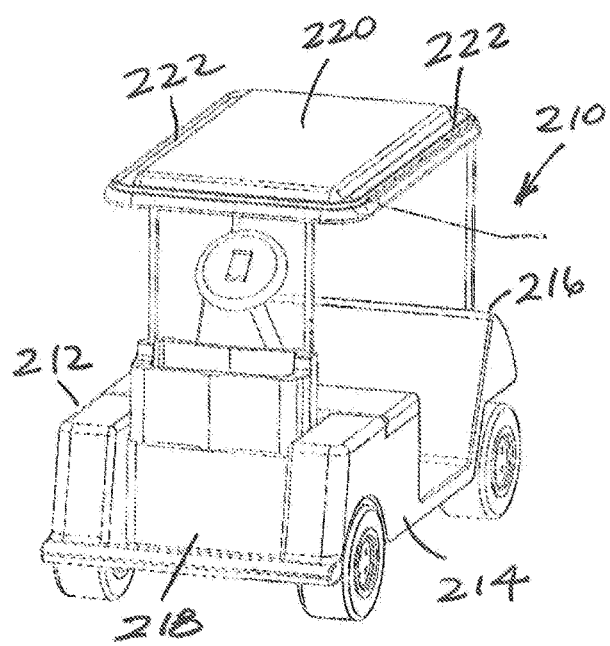
FIG. 9 is a rear peripheral view of a golf cart with a third embodiment of the accessories mounting device having two elongated attachment members mounted on the roof.

In the third embodiment shown in FIGS. 9-12, the accessories mounting apparatus includes a plurality of mounting apertures in the roof of the golf cart and two mounting rails with curved sidewalls that are secured using the mounting apertures. FIG. 9 shows a golf cart 210 having left and right sides 212, 214 and front and rear ends 216, 218 and a roof 220 extending above the golf cart 210 and between the two ends 216, 218. An accessory mounting apparatus 222 is attached to the roof 220 on the left and right sides and extends between the front and rear end 216, 218 of the roof 220. Another accessory mounting apparatus (not shown) can be mounted at the rear of the roof between the left and right sides.

Figure 10:
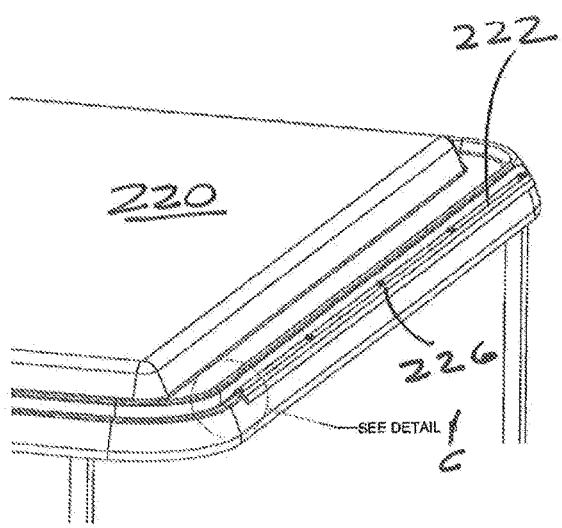
FIG. 10 is an enlarged view of the end of one of the two elongated attachment members shown in FIG. 9.
Figure 11:
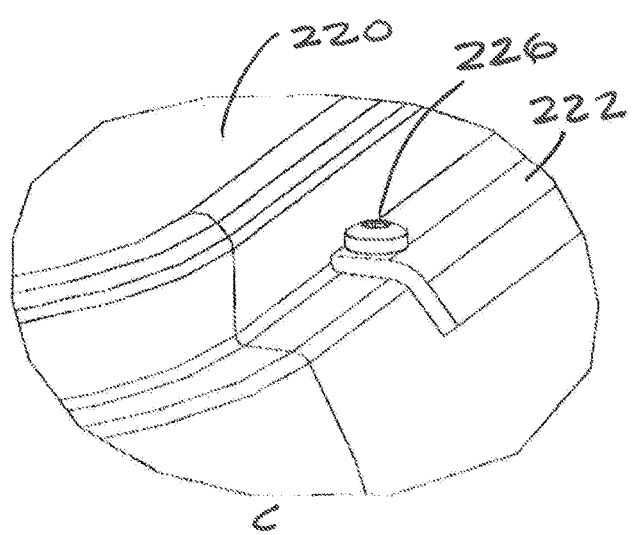
FIG. 11 is a detail showing a peripheral view of the end of the elongated attachment member shown in FIG. 10.
Figure 12:
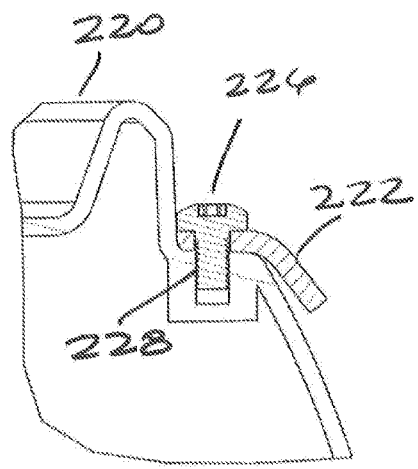
FIG. 12 is an end view of the end of the elongated attachment member shown in FIG. 10.

FIG. 10 shows an enlarged view of the accessories mounting apparatus 222 on the right side with FIGS. 11 and 12 show views of Detail C. Each accessory mounting apparatus 222 is attached to the side edge of the roof 220 on the left and right sides 212, 214 using fastening devices 226, such as screws or bolts, secured to mounting apertures 228 along the side edges of the roof 220. Each accessory mounting apparatus 222 extends towards the edge of the roof 220 along part of or the entire length of the roof 220. Various accessories can be attached to the accessory mounting apparatus 222, such as a valance or sidewall for protecting the interior of the golf cart 210 from the weather. In other embodiments, a windscreen or curtain (not shown) can be attached to or integrally formed as part of the accessory mounting apparatus 222.

Figure 13:
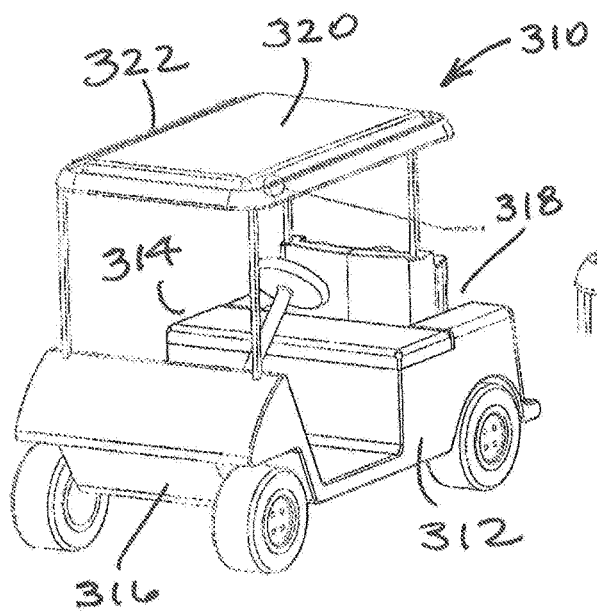
FIG. 13 is a front peripheral view of a golf cart with a fourth embodiment of the accessories mounting device having two elongated attachment members mounted on the roof.

In the fourth embodiment shown in FIGS. 13-16, the accessories mounting apparatus includes two lips extending from the roof of the golf cart and two mounting apparatus with a U-shaped end that fits over and is received by the lips. FIG. 13 shows a golf cart 310 having left and right sides 312, 314 and front and rear ends 316, 318 and a roof 320 extending above the golf cart 310 and between the two ends 316, 318. An accessory mounting apparatus 322 is attached to the roof 320 on the left and right sides 312, 314 and extends between the front and rear end 316, 318 of the roof 320. Another accessory mounting apparatus (not shown) can be mounted at the rear of the roof between the left and right sides.

Figure 14:
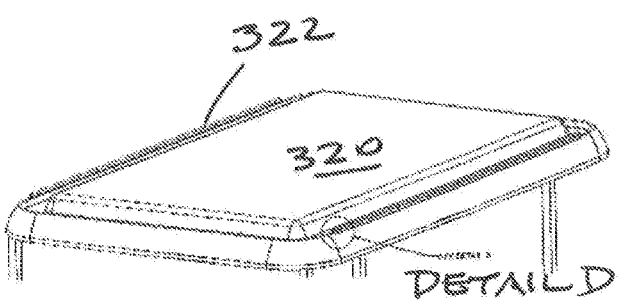
FIG. 14 is an enlarged view of the end of one of the two elongated attachment members shown in FIG. 13.
Figure 15:
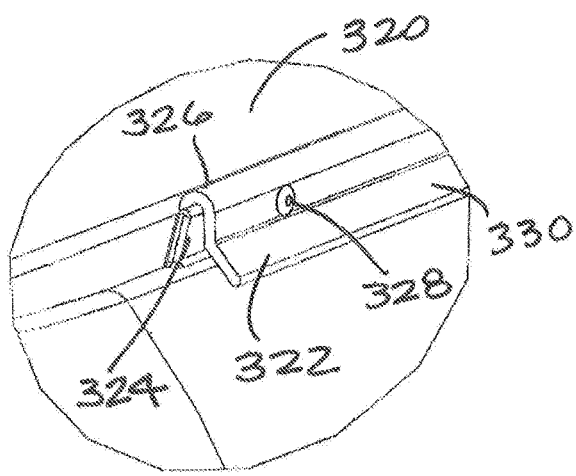
FIG. 15 is a detail showing a peripheral view of the end of the elongated attachment member shown in FIG. 14.
Figure 16:
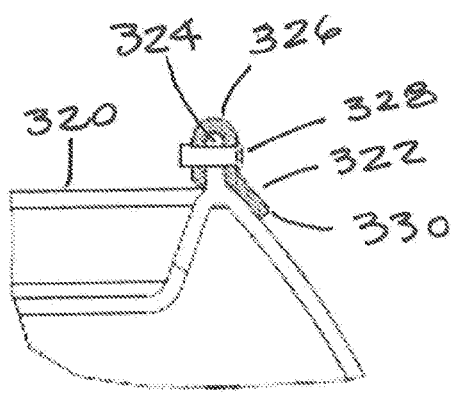
FIG. 16 is an end view of the elongated attachment member shown in FIG. 14.

FIG. 14 shows an enlarged view of the accessories mounting apparatus 322 on the left side with FIGS. 15 and 16 show views of Detail D. Each accessory mounting apparatus 322 is mounted to a lip 324 extending from the roof 320. Typically, the roof 320 is made from a hard plastic and the lips 324 are formed as part of the roof 320. Each accessory mounting apparatus 322 includes a U-shaped first end 326 that snugly fits over the lip 324 and substantially extends the length of the lip 324. Each accessory mounting apparatus 322 is attached to the side edge of the roof 320 on the left and right sides 322, 324 using fastening devices 328, such as screws or bolts, secured to mounting apertures in the lip 324. Various accessories 330 can be attached to the second end accessory mounting apparatus 322, such as a valance or sidewall for protecting the interior of the golf cart 310 from the weather. A windscreen or curtain (not shown) can be attached to or integrally formed as part of the accessory mounting apparatus 322.

Figure 17:
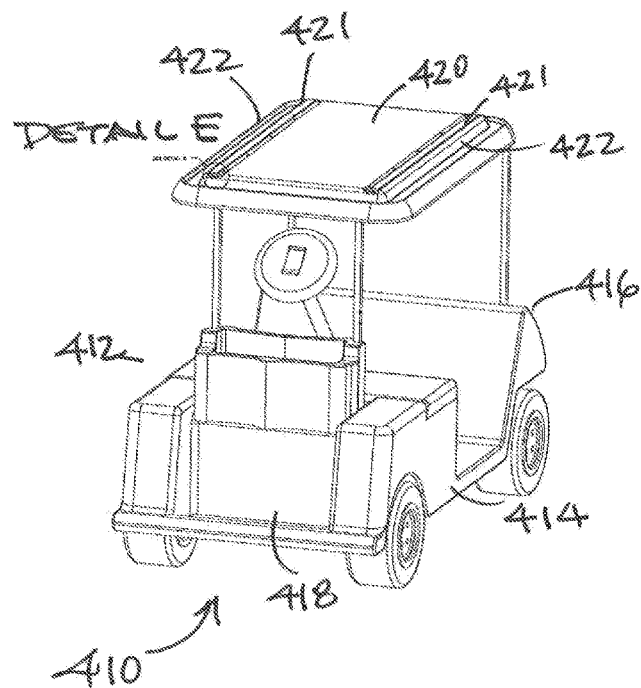
FIG. 17 is a front peripheral view of a golf cart with a fifth embodiment of the accessories mounting device having two elongated attachment members mounted on the roof.
Figure 18:
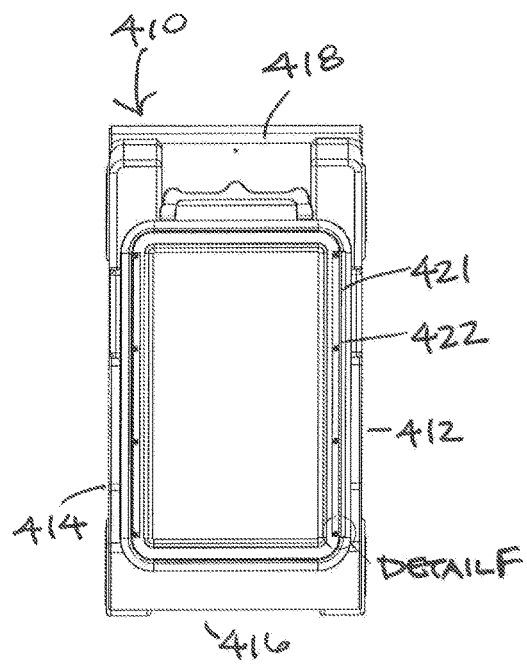
FIG. 18 is top view of the golf cart and the two elongated attachment members shown in FIG. 17.

In the fifth embodiment shown in FIGS. 17-20, the accessories mounting apparatus 422 has an elongated attachment member 421 that includes two or more threaded receptacles 424 located on the left and right sides 412, 414 of the roof 420 of the golf cart 410, which receive fastening devices 428, preferably screws or bolts, to secure two mounting apparatuses 422. FIGS. 17 and 18 show peripheral and top views of a golf cart 410 having left and right sides 412, 414 with a roof 420 extending above the golf cart 410 and between front and rear ends 416, 418. Accessory mounting apparatuses 422 extending between the front and rear end 416, 418 are attached to the roof 420 on the left and right sides 412, 414. Another accessory mounting apparatus (not shown) can be mounted at the rear end 418 of the roof 420 between the left and right sides 412, 414.

Figure 19:
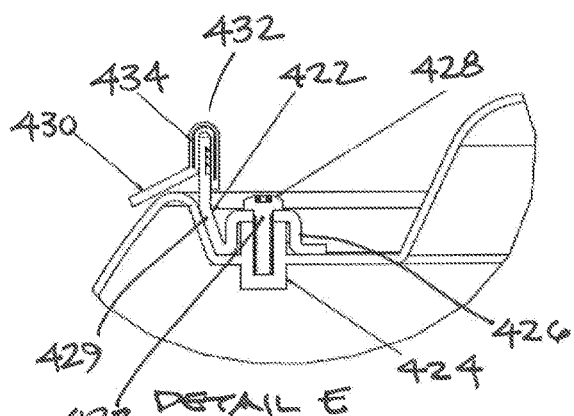
FIG. 19 is an end view of the end of the elongated attachment member shown in FIG. 17.
Figure 20:
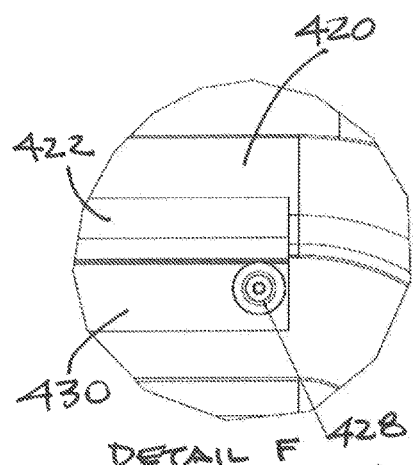
FIG. 20 is a detail showing a fastening device for attaching one end of the elongated attachment member shown in FIG. 18 to the golf cart.

FIG. 19 shows an end view of Detail E and FIG. 20 shows an enlarged top view of Detail F for the accessories mounting apparatus 422. The elongated attachment member 421 of each accessory mounting apparatus 422 fits over the two or more threaded receptacles 424 attached to the roof 420. Typically, the roof 420 is made from a hard plastic and the two or more threaded receptacles 424 are formed as part of the roof 420 or are attached to an existing roof 420. Each accessory mounting apparatus 422 includes a U-shaped section 426 that with two or more aperture 427 snugly fits over the two or more threaded receptacles 424. Each accessory mounting apparatus 422 is attached to the side edge of the roof 420 on the left and right sides 422, 424 using fastening devices 328, such as screws or bolts, which pass through apertures 427 and are threaded into the two or more threaded receptacles 424. Each accessory mounting apparatus 422 has a second section 429 that extends upwardly from the U-shaped section 426 on the outward side of the roof 420. Various accessories 430 can be attached to the second end 429 of the accessory mounting apparatus 422, such as a valance or sidewall for protecting the interior of the golf cart 410 from the weather. Preferred accessories 430 have U-shaped attachment connectors 432 with a steel core 434 that extend along the length of the mounting apparatus 422 and snugly fit over the second end 429 of the mounting apparatus 422. A windscreen or curtain (not shown) can be attached to or integrally formed as part of the U-shaped attachment connectors 432.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An apparatus capable of being used for mounting accessories to a golf cart roof having an exterior surface, front and rear ends, right and left sides and one or more channels formed in the exterior surface on one or more of the left side, the right side and the rear end, the apparatus comprising:
    an elongated base member having a top surface, a first end, a second end, and a horizontal slot in communication with the top surface through an opening, wherein the elongated slotted base is mounted in one of the one or more channels formed in the exterior surface of the roof, and wherein the elongated slotted base, the horizontal slot, and the opening extend between the first and second ends of the elongated base, and the elongated base substantially extends between the front and rear ends or the left and right sides of the golf cart; and
    an elongated attachment member slidably insertable into the slotted base and having a neck that extends through the opening in the slotted base to a top surface, wherein the top surface is adapted for the attachment of accessories.

2. The apparatus for mounting accessories to a golf cart roof according to claim 1, wherein the accessories are integrally formed as part of the elongated attachment member.

3. An apparatus capable of being used for mounting accessories to a golf cart roof having front and rear ends and right and left sides, the apparatus comprising:
    an elongated base member having a first end, a second end, a top surface, a horizontal slot in communication with the top surface through an opening, and opposing stepped sidewalls having a plurality of mounting apertures, wherein the elongated base member is mounted in a channel on at least one of the left side, right side, and rear end of the golf cart roof and substantially extends between one of the front and rear ends and the left and right sides;
    a plurality of fastening devices for securing the elongated base member in the channel; and
    an elongated attachment member slidably insertable into the slotted base and having a neck that extends through the opening in the slotted base to a top surface, wherein the top surface is adapted for the attachment of accessories.

4. The apparatus for mounting accessories to a golf cart roof according to claim 3, wherein the accessories are integrally foil led as part of the elongated attachment member.

5. The apparatus for mounting accessories to a golf cart roof according to claim 3, wherein the elongated base member is mounted in one of the one or more channels in the golf cart roof.

6. An apparatus capable of being used for mounting accessories to a golf cart roof having front and rear ends and right and left sides, the apparatus comprising:
    an elongated attachment member having a length, a first end, a second end, and at least two sections extending along the length, wherein a first section is substantially flat and a second section extends downwardly from the first section, wherein the elongated attachment member is mounted on at least one of the left side, right side, and rear end of the golf cart roof and substantially extending between the front and rear ends or the left and right sides; and
    a plurality of fastening devices for securing the elongated attachment member to the roof,
    wherein a section of the elongated attachment member opposite the first section is adapted for the attachment of accessories.

7. The apparatus for mounting accessories to a golf cart roof according to claim 6, wherein the first section of the elongated attachment member has a plurality of apertures.

8. An apparatus capable of being used for mounting accessories to a golf cart roof having front and rear ends and right and left sides, the apparatus comprising:
    an elongated lip attached to and extending upwardly from at least one of the left side, right side, and rear end of the golf cart roof;
    an elongated attachment member having a width, a first end and a second end and substantially extending between the front and rear ends or the left and right sides, wherein the width of the elongated attachment member is U-shaped and adapted to snugly fit over the lip; and
    a plurality of fastening devices for securing the elongated attachment member to the lip.

9. The apparatus for mounting accessories to a golf cart roof according to claim 8, wherein the accessories are integrally formed as part of the elongated attachment member.

10. An apparatus capable of being used for mounting accessories to a golf cart roof having front and rear ends and right and left sides, the apparatus comprising:
    an elongated attachment member having a first end and a second end and mounted on the golf cart roof, wherein the elongated attachment member substantially extends between at least one of the front and rear ends and the left and right sides, wherein the elongated attachment member has a U-shaped section and an upwardly extending section;
    at least two threaded receptacles that are affixed to the golf cart roof on at least one of the left side, the right side, and the rear end, wherein the U-shaped section of the elongated attachment member fits over the at least two threaded receptacles on the roof; and
    at least two fastening devices for securing the elongated attachment member to the threaded receptacles,
    wherein the upwardly extending section is adapted to secure accessories to the golf cart.

11. The apparatus of claim 10 further comprising one or more apertures in the elongated attachment member that correspond to the locations of the threaded receptacles, wherein the at least two fastening devices pass through the apertures and into the threaded receptacles.

\* \* \* \* \*